United States Patent
Hayashi

(10) Patent No.: US 7,874,332 B2
(45) Date of Patent: Jan. 25, 2011

(54) PNEUMATIC TIRE WITH TREAD GAUGE OF 95 MM OR MORE HAVING CIRCUMFERENTIAL THIN GROOVES, CROSSWISE THIN GROOVES AND SUB-THIN GROOVES BEING CLOSED AT TIME OF TREAD CONTACT OF FIXED LOAD

(75) Inventor: Hiroshi Hayashi, Kurume (JP)

(73) Assignee: Bridgestone Corporation, Tokyo (JP)

( * ) Notice: Subject to any disclaimer, the term of this patent is extended or adjusted under 35 U.S.C. 154(b) by 1070 days.

(21) Appl. No.: 11/630,130

(22) PCT Filed: Jun. 15, 2005

(86) PCT No.: PCT/JP2005/010935

§ 371 (c)(1),
(2), (4) Date: Dec. 20, 2006

(87) PCT Pub. No.: WO2006/001202

PCT Pub. Date: Jan. 5, 2006

(65) Prior Publication Data

US 2007/0199633 A1   Aug. 30, 2007

(30) Foreign Application Priority Data

Jun. 23, 2004   (JP) .............................. 2004-185498

(51) Int. Cl.
   *B60C 11/11*   (2006.01)
(52) U.S. Cl. .............................. 152/209.18; 152/209.12; 152/209.27; 152/DIG. 3; 152/902
(58) Field of Classification Search ............ 152/209.12, 152/209.18, 209.27, DIG. 3, 902
See application file for complete search history.

(56) References Cited

U.S. PATENT DOCUMENTS

| | | | | |
|---|---|---|---|---|
| 3,584,670 A | * | 6/1971 | Verdier ........................ | 152/902 |
| D273,777 S | * | 5/1984 | Igarashi et al. ............. | D12/579 |
| 5,048,583 A | | 9/1991 | Goto et al. | |
| D333,453 S | * | 2/1993 | Cook et al. ................. | D12/579 |
| D340,436 S | * | 10/1993 | Baus .......................... | D12/596 |
| D385,519 S | * | 10/1997 | de Briey-Terlinden et al. ........... | D12/579 |

(Continued)

FOREIGN PATENT DOCUMENTS

EP   1403098   *   3/2004

(Continued)

OTHER PUBLICATIONS

Machine translation for Japan 07-081323 (no date).*

(Continued)

*Primary Examiner*—Steven D Maki
(74) *Attorney, Agent, or Firm*—Sughrue Mion, PLLC

(57) ABSTRACT

A pneumatic tire includes a column of center blocks (18) partitioned, on a tread center region, by circumferential thin grooves (14) formed along a tire circumferential direction and crosswise thin grooves (15) formed along a tire width direction, and columns of shoulder blocks (19) partitioned by the circumferential thin grooves (14) and main lug grooves (16) on shoulder portions. Each of the center blocks (18) includes one or more sub-thin grooves (17), each of which has a length of 100 to 180% of a circumferential length of the center block (18).

8 Claims, 4 Drawing Sheets

U.S. PATENT DOCUMENTS

| | | | |
|---|---|---|---|
| 6,761,196 B2 * | 7/2004 | Takubo | 152/209.12 |
| 2002/0170644 A1 * | 11/2002 | Comps | 152/209.5 |
| 2004/0211502 A1 * | 10/2004 | Ono | 152/209.27 |
| 2006/0037684 A1 * | 2/2006 | Vervaet | 152/209.24 |

FOREIGN PATENT DOCUMENTS

| | | | |
|---|---|---|---|
| JP | 2-256502 A | | 10/1990 |
| JP | 3-086603 A | | 4/1991 |
| JP | 3-128705 A | | 5/1991 |
| JP | 05-213012 | * | 8/1993 |
| JP | 5-213012 A | | 8/1993 |
| JP | 07-081323 | * | 3/1995 |
| JP | 07081323 A | | 3/1995 |
| JP | 9-058220 A | | 3/1997 |
| JP | 11-034615 | * | 2/1999 |
| JP | 11-222009 | * | 8/1999 |
| JP | 11-222009 A | | 8/1999 |
| JP | 2001-213120 A | | 8/2001 |
| WO | WO 02/100664 A1 | | 12/2002 |

OTHER PUBLICATIONS

Machine translation for Japan 11-034615 (no date).*
Machine translation for Japan 05-213012 (no date).*
Machine translation for Japan 11-222009 (no date).*

* cited by examiner

PNEUMATIC TIRE WITH TREAD GAUGE OF 95 MM OR MORE HAVING CIRCUMFERENTIAL THIN GROOVES, CROSSWISE THIN GROOVES AND SUB-THIN GROOVES BEING CLOSED AT TIME OF TREAD CONTACT OF FIXED LOAD

TECHNICAL FIELD

The present invention relates to a pneumatic tire excellent in heat generation resistance, and particularly to an off-the-road pneumatic tire for a heavy load in a construction vehicle category.

BACKGROUND ART

Heretofore, in an off-the-road pneumatic tire, there has been a case where a belt of a crown portion is cut because the crown portion treads on an obstacle such as a rock. During running, a crack advances into rubber of the pneumatic tire from such a cut portion as describe above, a cracked portion of the rubber is peeled off, and the pneumatic tire has thereby become junk. As a past accomplishment, by enhancing heat generation property of the rubber, the crack became difficult to advance even if the portion of the belt was cut. Accordingly, a reduction of the heat generation in tread rubber has been promoted.

For example, there is disclosed a technology for extending an entire running period of the pneumatic tire by employing tread rubber of a heat generation resistance type (for example, refer to Japanese Patent Laid-Open Publication No. 2001-213120).

However, in the tread rubber of the heat generation resistance type, in general, abrasion resistance thereof tends to be decreased. Accordingly, it has been necessary to cool the crown portion so as not to largely reduce the abrasion resistance and durability of blocks.

In this connection, in consideration for the above-described problem, it is an object of the present invention to provide a pneumatic tire which enhances the heat generation resistance of the crown portion and enhances cut separation resistance thereof.

DISCLOSURE OF THE INVENTION

In order to solve the above-described problem, a feature of the present invention is summarized to be a pneumatic tire including a column of center blocks partitioned, on a tread center region, by circumferential thin grooves formed along a tire circumferential direction and crosswise thin grooves formed along a tire width direction, and columns of shoulder blocks partitioned by the circumferential thin grooves and main lug grooves on shoulder portions, wherein a tread gauge on the tread center region is 95 mm or more, a depth of the lug grooves is 70 to 85% of the tread gauge, a negative ratio in a tread contact width is 15 to 30%, and the number of center blocks or shoulder blocks is 32 to 44, and the center blocks include one or more sub-thin grooves, each of which has a length of 100 to 180% of a circumferential length of the center block.

In the pneumatic tire according to the feature of the present invention, the tread gauge on the tread center region is 95 mm or more, and the depth of the lug grooves is 70 to 85% of the tread gauge, and accordingly, the pneumatic tire is suitable for a heavy-load radial tire for a supersized construction vehicle.

Moreover, when the negative ratio in the tread contact width is less than 15%, it is difficult to reduce the heat generation, and when the negative ratio in the tread contact width exceeds 30%, a problem occurs in abrasion performance of the pneumatic tire.

Furthermore, when the number of center blocks or shoulder blocks is less than 32, it is difficult to reduce the heat generation, and when the number of center blocks or shoulder blocks exceeds 44, the problem occurs in the abrasion performance.

Moreover, when the length of the sub-thin groove is less than 100% of the circumferential length of the center block, a cooling effect becomes low, and when the length of the sub-thin groove exceeds 180%, rigidity of the block becomes low.

In accordance with the pneumatic tire according to the feature of the present invention, the at least one sub-thin groove is provided on the center block in the heavy-load radial tire for a construction vehicle, which has the column of the center blocks. Accordingly, the cooling effect for the crown portion is increased, and the cut separation resistance thereof can be enhanced.

Moreover, it is preferable that each of the sub-thin grooves be closed at a time of tread contact of a fixed load, and have a depth of 60 to 95% of the tread gauge. Here, "a fixed load" is defined to be a load based on a standard of TRA (THE TIRE AND RIM ASSOCIATION, INC.) or ETRO (Europian Tyre and Rim Technical Organisation-Standards Manual). When the depth of the sub-thin groove is less than 60%, the cooling effect is small, and when the depth of the sub-thin groove exceeds 95%, demolding property is poor, and durability of a mold is deteriorated.

Furthermore, it is preferable that the circumferential thin grooves and the crosswise thin grooves be closed at the time of the tread contact of a fixed load, and have a depth of 60 to 95% of the tread gauge. When the depth of the circumferential thin grooves and the crosswise thin grooves is less than 60%, the cooling effect is small, and when the depth of the circumferential thin grooves and the crosswise thin grooves exceeds 95%, the demolding property is poor, and the durability of the mold is deteriorated.

Moreover, preferably, each of the center blocks is partitioned by the sub-thin groove into two sub-blocks having surface areas equivalent to each other, a starting edge and terminal edge of the sub-thin groove are offset from each other in the tire width direction in the one center block, each of lengths of treading side edges of the sub-blocks is 0.3 to 0.7 time a length of a trading side edge of the center block, and each of lengths of ejection side edges of the sub-blocks is 0.3 to 0.7 time a length of an ejecting side edge of the center block. Here, "offset" refers to that phases of the starting edge and the terminal edge are shifted from each other. Specifically, the starting edge and the terminal edge are not present on the same straight line parallel to the tire circumferential direction. As described above, the starting edge and terminal edge of the sub-thin groove are offset from each other in the tire width direction, and accordingly, an intersection point of the grooves can be avoided being formed, and a small stone can be prevented from intruding into the groove.

Furthermore, the center block is divided into the sub-blocks at the positions where the lengths of the sub-blocks are 0.3 to 0.7 time the length of the center block. This is because, when the center block is divided at an end portion of the center block, rigidity of the sub-blocks is decreased.

Moreover, each of the sub-thin grooves may have a straight line shape having an inclination of 0 to 90° with respect to the tire circumferential direction, or may have a crank shape. Alternatively, the sub-thin groove may have a wave shape or a zigzag shape.

Furthermore, it is preferable that the starting edge of the sub-thin groove of the one center block and a terminal edge of a sub-thin groove of a center block adjacent to the one center block concerned in the circumferential direction be offset from each other in the tire width direction. By the fact that the starting edge and the terminal edge are offset from each other in the tire width direction, the intersection point of the grooves can be avoided being formed, and the small stone can be prevented from intruding into the groove.

BEST MODE OF CARRYING OUT THE INVENTION

Figure 1:
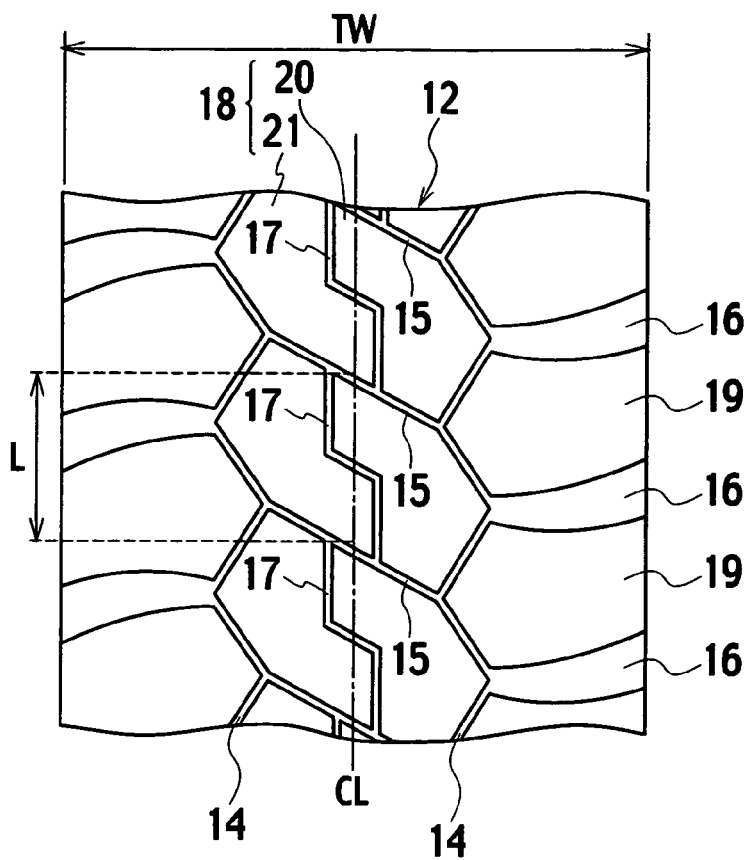
FIG. 1 is a development view of a tread of a pneumatic tire according to an embodiment of the present invention (No. 1).

Next, a description will be made of an embodiment of the present invention with reference to the drawings. In the following description of the drawings, the same or similar reference numerals are assigned to the same or similar portions. However, it should be noted that the drawings are schematic ones, and that a ratio of the respective dimensions and the like are different from actual ones. Hence, specific dimensions and the like are the ones to be determined in consideration for the following description. Moreover, as a matter of course, the respective drawings include portions different thereamong in dimensional relationship and ratio.

(Structure of Pneumatic Tire)

As shown in FIG. 1, on a tread 12, a pneumatic tire according to the embodiment of the present invention includes a column of center blocks 18 partitioned, on a tread center region, by circumferential thin grooves 14 formed along a tire circumferential direction and crosswise thin grooves 15 formed along a tire width direction, and columns of shoulder blocks 19 partitioned by the circumferential thin grooves 14 and main lug grooves 16 on shoulder portions.

Here, the "tread center region" refers to a region of 30 to 60% of a tread width TW with respect to a tire equatorial plane CL as a center. A tread gauge in the tread center region is 95 mm or more. Moreover, a negative ratio (groove area ratio) in a tread contact width of the pneumatic tire according to this embodiment is 15 to 30%.

Moreover, the main lug grooves 16 are wide lug grooves which are not closed even when the pneumatic tire makes a loaded-rolling movement. A depth of the lug grooves is 70 to 85% of the tread gauge in the tread center region. Furthermore, the circumferential thin grooves 14 and the crosswise thin grooves 15 are closed at a time of tread contact of a fixed load, and have a depth of 60 to 95% of the tread gauge in the tread center region.

Moreover, the number of center blocks 18 or shoulder blocks 19 is 32 to 44.

The pneumatic tire having the above-described features is suitable for a heavy-load radial tire for a construction vehicle.

Moreover, each of the center blocks 18 includes one or more sub-thin grooves 17 with a crank shape, each of which has a length of 100 to 180% of a circumferential length L of the center block 18. Such a sub-thin groove 17 is closed at the time of the tread contact of a fixed load, and has a depth of 60 to 95% of the tread gauge in the tread center region.

Figure 2:
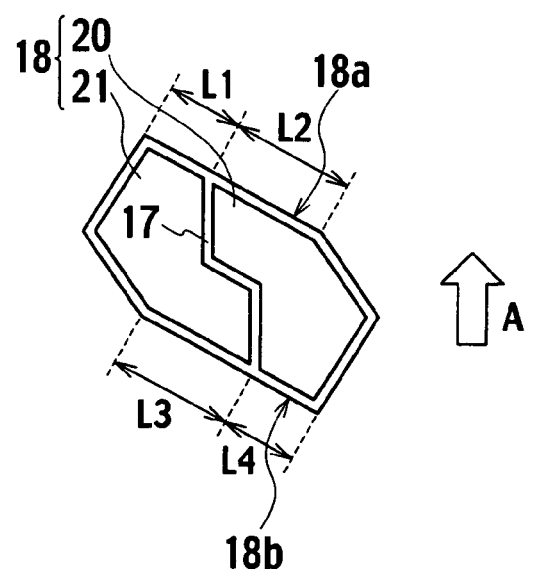
FIG. 2 is a view showing details of a center block of FIG. 1.

When one of the center blocks 18 is enlarged, as shown in FIG. 2, the one center block 18 is partitioned by the sub-thin groove 17 into two sub-blocks 20 and 21 having surface areas equivalent to each other. In the one center block 18, a starting edge and terminal edge of the sub-thin groove 17 are offset from each other in the tire width direction. When a rotational direction of the tire is a direction of an arrow A in FIG. 2, each of lengths L1 and L2 of a treading side edge 18a of the sub-blocks 20 and 21 is 0.3 to 0.7 time a length of the treading side edge 18a of the center block 18. In a similar way, each of lengths of an ejecting side edge 18b of the sub-blocks 20 and 21 is 0.3 to 0.7 time a length of the ejecting side edge 18b of the center block 18. Specifically, the center block 18 is divided so that values of L1 and L2 can be 3:7 to 7:3 and that values of L3 and L4 can be 3:7 to 7:3. For example, the center block 18 is divided so as to establish a relationship of L1:L2=L4:L3=3.5:6.5.

Moreover, the starting edge of the sub-thin groove 17 of the one center block 18 and a terminal edge of the sub-thin groove 17 of the center block 18 adjacent to the one center block 18 concerned in the circumferential direction are offset from each other in the tire width direction.

Figure 3:
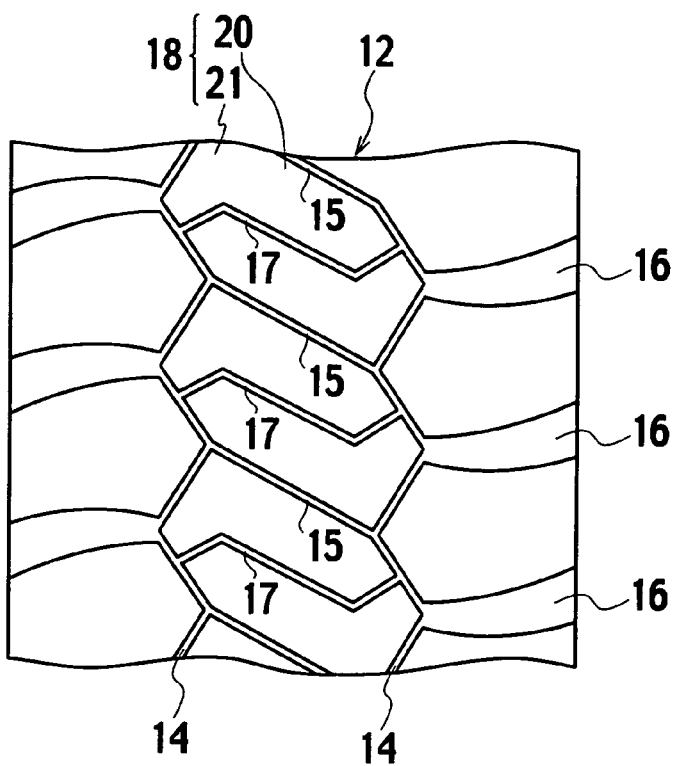
FIG. 3 is a development view of a tread of the pneumatic tire according to the embodiment of the present invention (No. 2).

Moreover, though the sub-thin grooves 17 are disposed in the tire circumferential direction in FIG. 1 and FIG. 2, the sub-thin grooves 17 may be disposed in the tire width direction as shown in FIG. 3.

Furthermore, though the shape of the sub-thin grooves 17 is shown as the crank shape in FIG. 1 to FIG. 3, the shape may be other shapes.

Figure 4:
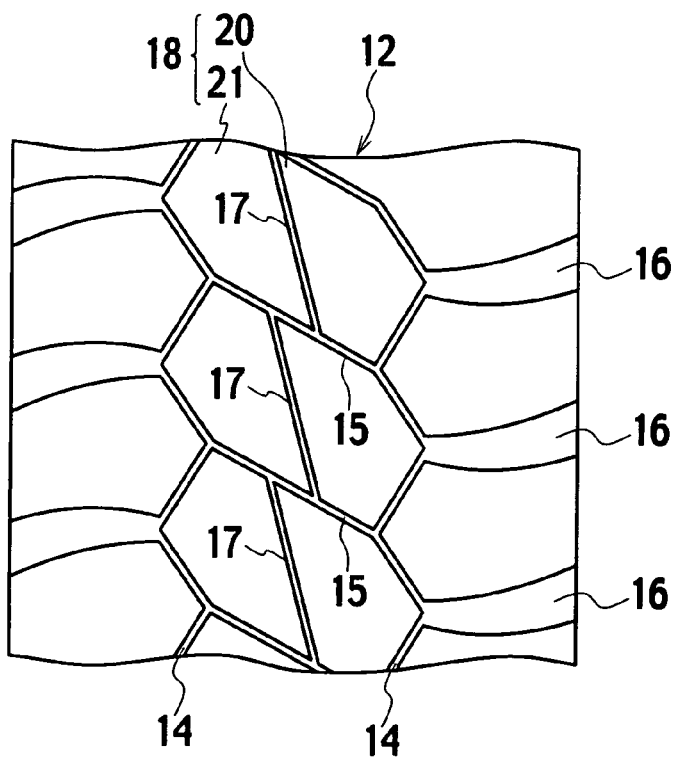
FIG. 4 is a development view of a tread of the pneumatic tire according to the embodiment of the present invention (No. 3).

For example, sub-thin grooves 17 shown in FIG. 4 have a straight line shape having an inclination of 0 to 90° with respect to the tire circumferential direction. Moreover, sub-thin grooves 17 shown in FIG. 5 have a wave shape, and sub-thin grooves shown in FIG. 6 have a zigzag shape.

Figure 5:
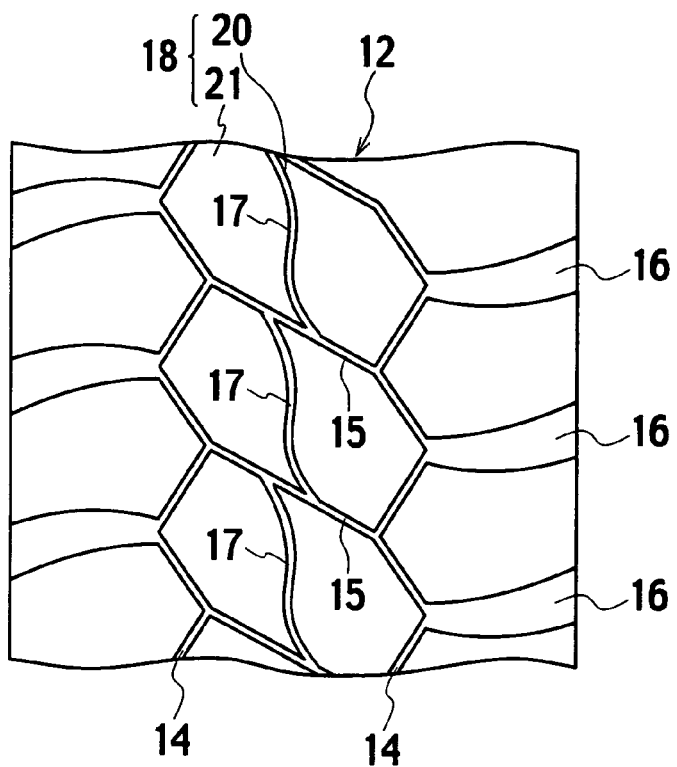
FIG. 5 is a development view of a tread of the pneumatic tire according to the embodiment of the present invention (No. 4).
Figure 6:
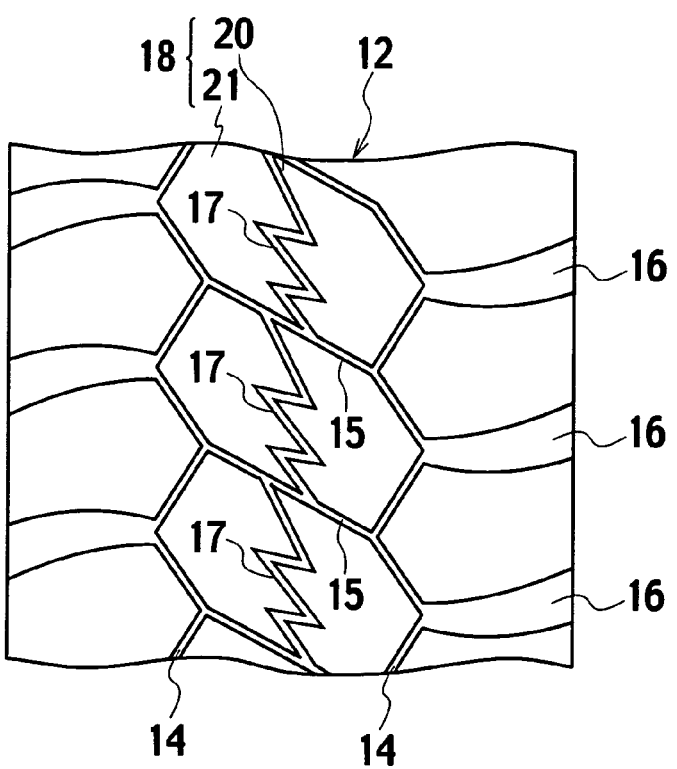
FIG. 6 is a development view of a tread of the pneumatic tire according to the embodiment of the present invention (No. 5).

Also in each of pneumatic tires shown in FIG. 4 to FIG. 6, in a similar way to the pneumatic tire shown in FIG. 1, each sub-thin groove 17 partitions the center block 18 into two sub-blocks 20 and 21 having surface areas equivalent to each other, and in the one center block 18, a starting edge and terminal edge of the sub-thin groove 17 are offset from each other in the tire width direction. Each of lengths L1 and L2 of a treading side edge of the sub-blocks 20 and 21 is 0.3 to 0.7 time a length of the treading side edge of the center block 18. In a similar way, each of lengths of an ejecting side edge of the sub-blocks 20 and 21 is 0.3 to 0.7 time a length of the ejecting side edge of the center block 18. Specifically, the center block 18 is divided so that values of L1 and L2 can be 3:7 to 7:3 and that values of L3 and L4 can be 3:7 to 7:3.

Moreover, the starting edge of the sub-thin groove 17 of the one center block 18 and a terminal edge of the sub-thin groove 17 of the center block 18 adjacent to the one center block 18 concerned in the circumferential direction are offset from each other in the tire width direction.

(Function And Effect)

The pneumatic tire according to this embodiment includes one or more of the sub-thin grooves 17, each of which has the length of 100 to 180% of the circumferential length of the center block. Accordingly, the cooling effect for the crown portion is increased, and the cut separation resistance thereof can be enhanced. Each of the sub-thin grooves 17 has the length of 100 to 180% of the circumferential length of the center block, thus exerting a temperature reduction effect of approximately 1.5 to 4.5° C.

Moreover, when the length of the sub-thin groove is less than 100% of the circumferential length of the center block, the cooling effect is low, and when the length of the sub-thin groove exceeds 180%, rigidity of the block is decreased.

Moreover, each sub-thin groove 17 of the pneumatic tire according to this embodiment is closed at the time of the tread contact of a fixed load, and has a depth of 60 to 95% of the tread gauge. Accordingly, the cooling effect is increased, and the demolding property and the durability of the mold become good.

In a similar way, each circumferential thin groove 14 and each crosswise thin groove 15 are closed at the time of the tread contact of a fixed load, and have a depth of 60 to 95% of the tread gauge. Accordingly, the cooling effect is increased, and the demolding property and the durability of the mold become good.

Furthermore, each center block 18 of the pneumatic tire according to this embodiment is partitioned by the sub-thin groove 17 into the two sub-blocks 20 and 21 having the surface areas equivalent to each other, and in the one center block 18, the starting edge and terminal edge of the sub-thin groove are offset from each other in the tire width direction. Moreover, the starting edge of the sub-thin groove of the one center block 18 and the terminal edge of the sub-thin groove of the center block adjacent to the one center block 18 concerned in the circumferential direction are offset from each other in the tire width direction. Accordingly, an intersection point of the grooves can be avoided being formed, and a small stone can be prevented from intruding into the groove.

Moreover, each of the lengths of the treading side edge 18a of the sub-blocks 20 and 21 is 0.3 to 0.7 time the length of the treading side edge 18a of the center block 18, and each of the lengths of the ejecting side edge 18b of the sub-blocks 20 and 21 is 0.3 to 0.7 time the length of the ejecting side edge 18b of the center block. Accordingly, the rigidity of the sub-blocks 20 and 21 is not decreased, and at the time of the tread contact, by the rolling movement, the closing of the thin grooves in the circumferential direction can be optimized, and a traction load can by equalized. Moreover, when each of the lengths of the treading side edge 18a of the sub-blocks 20 and 21 falls down below 0.3 or exceeds 0.7 time, the sub-thin groove 17 causes a difference in closed quantity between a center portion and peripheral portions thereof at the time of the rolling movement, and it is concerned that the heat generation property is deteriorated and that partial abrasion is accelerated. Moreover, it is apprehended that the rigidity of the blocks becomes insufficient for the treading and the ejection at a time of traction.

Furthermore, as described above, the pneumatic tire according to this embodiment is excellent in heat generation resistance, and accordingly, can be suitably used as the heavy-load radial tire for a construction vehicle.

EXAMPLE

A description will be made of the present invention more in detail by mentioning an example below. However, the present invention is not limited to the following example at all.

Figure 7:
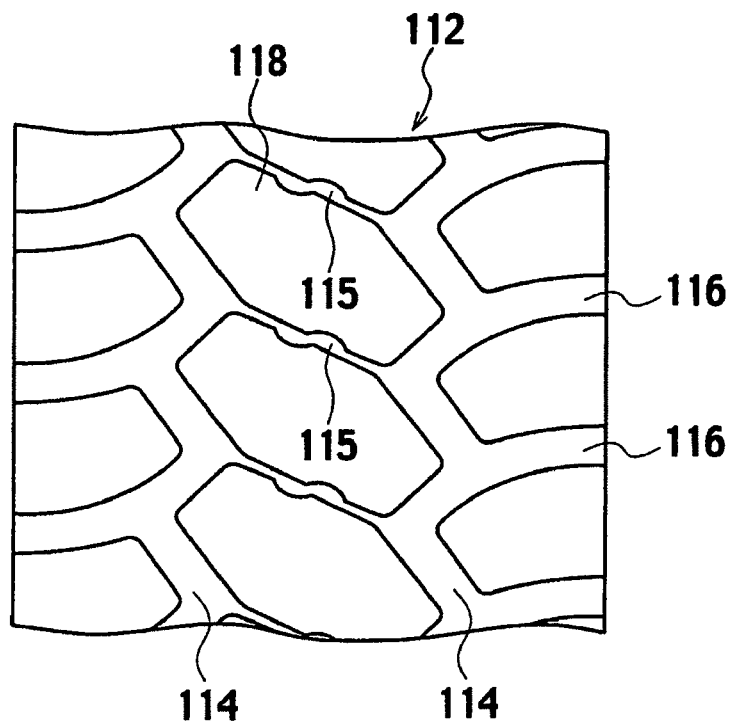
FIG. 7 is a development view of a tread of a pneumatic tire according to Conventional example 1.
Figure 8:
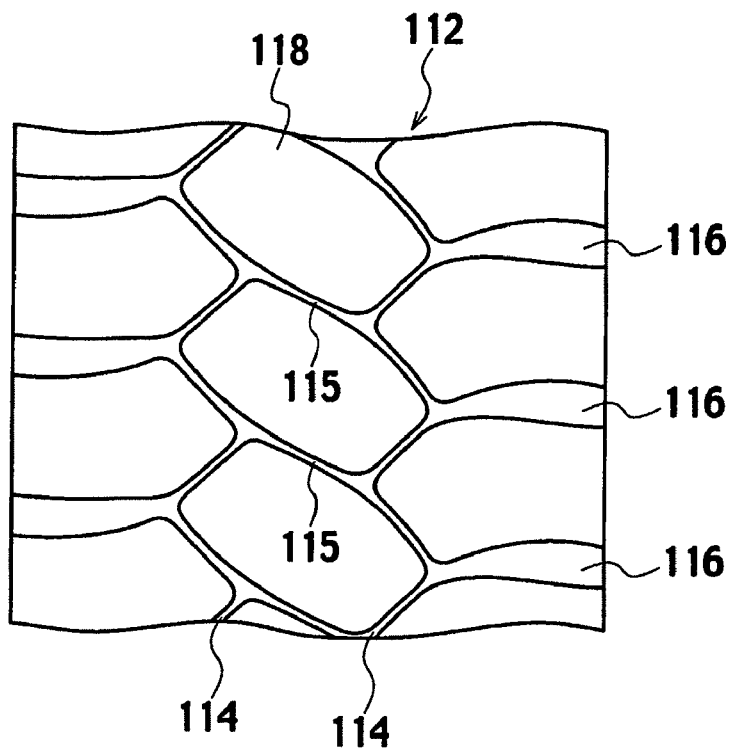
FIG. 8 is a development view of a tread of a pneumatic tire according to Conventional example 2.

In order to confirm the effect of the present invention, one type of the tire of the example to which the present invention is applied and two types of tires of conventional examples were manufactured, and the heat generation resistance of the tread portion of each of the tires was investigated. In both of the example and the comparative examples, a tire size was 46/90R57. Tread patterns of Example 1, Conventional example 1, and Conventional example 2, which are as described above, were as shown in FIG. 1, FIG. 7, and FIG. 8, respectively.

The heat generation resistance of each tread portion was evaluated in such a manner that the tire was attached onto a design rim defined in the TRA and an off-the-road drum test was performed under conditions where an air pressure was 7.0 kgf/cm$^2$ and a load applied to the tire was 51500 kgf. As a result, the highest temperature on the tread portion after 24-hour running was measured, and it was defined that the heat generation resistance was more excellent as a value of the measurement, which was represented as an index with a measurement value of the tire of Conventional example 1 taken as 100, was larger.

TABLE 1

| | | EXAMPLE | CONVENTIONAL EXAMPLE 1 | CONVENTIONAL EXAMPLE 2 |
|---|---|---|---|---|
| TREAD GAUGE ON CENTER REGION (mm) | | 98 | 105.5 | 111.5 |
| NEGATIVE RATIO | | 22 | 27 | 18 |
| CIRCUMFERENTIAL THIN GROOVE | LENGTH (mm) | 340 | NO CIRCUMFERENTIAL THIN GROOVE IS PROVIDED | 410 |
| | DEPTH (mm) | TREAD GAUGE × 82% | | TREAD GAUGE × 72% |
| CROSSWISE THIN GROOVE | LENGTH (mm) | 310 | NO CROSSWISE THIN GROOVE IS PROVIDED | 220 |
| | DEPTH (mm) | TREAD GAUGE × 82% | | TREAD GAUGE × 72% |
| DEPTH OF MAIN LUG GROOVE (mm) | | TREAD GAUGE × 87% | TREAD GAUGE × 87% | TREAD GAUGE × 87% |
| NUMBER OF CENTER BLOCKS (PIECES) | | 40 | 36 | 36 |
| NUMBER OF SHOULDER BLOCKS (PIECES) | | 40 | 36 | 36 |
| SUB-THIN GROOVE | LENGTH (mm) | CENTER BLOCK LENGTH × 166% | NO SUB-THIN GROOVE IS PROVIDED | NO SUB-THIN GROOVE IS PROVIDED |
| | DEPTH (mm) | TREAD GAUGE × 82% | | |
| | L1: L2 AND L3: L4 | 3.5:6.5 | | |
| HEAT GENERATION PROPERTY (INDEX) | | 106 | 100 | 100 |

(Result)

In Example 1, the heat generation resistance was enhanced as compared with those of Conventional examples 1 and 2. Hence, it was able to be confirmed that the heat generation resistance is enhanced by providing the sub-thin grooves, each of which has the length of 100 to 180% of the circumferential length of the center block.

INDUSTRIAL APPLICABILITY

As described above, the pneumatic tire according to the present invention enhances the heat generation resistance, and accordingly can be suitably used as the heavy-load radial tire for a construction vehicle.

The invention claimed is:

1. A pneumatic tire including a column of center blocks partitioned, on a tread center region, by circumferential thin grooves (14) formed along a tire circumferential direction and crosswise thin grooves (15) formed along a tire width direction, and columns of shoulder blocks partitioned by the circumferential thin grooves (14) and main lug grooves (16) on shoulder portions, wherein a tread gauge on the tread center region is 95 mm or more, a depth of the lug grooves is 70 to 85% of the tread gauge, a negative ratio in a tread contact width is 15 to 30%, and the number of center blocks (18) or shoulder blocks (19) is 32 to 44, the center blocks (18) include one or more sub-thin grooves (17), each of which has a length of 100 to 180% of a circumferential length of the center block (18), and the circumferential thin grooves (14), the crosswise thin grooves (15) and the sub-thin grooves (17) are closed at a time of the tread contact of a fixed load.

2. The pneumatic tire according to claim 1, wherein each of the sub-thin grooves (17) has a depth of 60 to 95% of the tread gauge.

3. The pneumatic tire according to claim 1, wherein the circumferential thin grooves (14) and the crosswise thin grooves (15) have a depth of 60 to 95% of the tread gauge.

4. The pneumatic tire according to claim 1, wherein each of the center blocks (18) is partitioned by the sub-thin groove (17) into two sub-blocks (20, 21) having surface areas equivalent to each other, a starting edge and terminal edge of the sub-thin groove (17) are offset from each other in the tire width direction in the one center block (18), each of lengths of treading side edges of the sub-blocks (20, 21) is 0.3 to 0.7 time a length of a treading side edge of the center block (18), and each of lengths of ejection side edges of the sub-blocks (20, 21) is 0.3 to 0.7 time a length of an ejecting side edge of the center block (18).

5. The pneumatic tire according to claim 1, wherein each of the sub-thin grooves (17) has a straight line shape having an inclination of 0 to 90° with respect to the tire circumferential direction.

6. The pneumatic tire according to claim 1, wherein each of the sub-thin grooves (17) has a crank shape.

7. The pneumatic tire according to claim 1, wherein each of the sub-thin grooves (17) has a wave shape or a zigzag shape.

8. The pneumatic tire according to claim 1, wherein the starting edge of the sub-thin groove (17) of the one center block (18) and a terminal edge of a sub-thin groove (17) of a center block (18) adjacent to the one center block (18) in the circumferential direction are offset from each other in the tire width direction.

* * * * *